C. R. CRAM.
OVERSHOE FOR HORSES.
APPLICATION FILED SEPT. 28, 1912.
1,068,415.
Patented July 29, 1913.
2 SHEETS—SHEET 2.
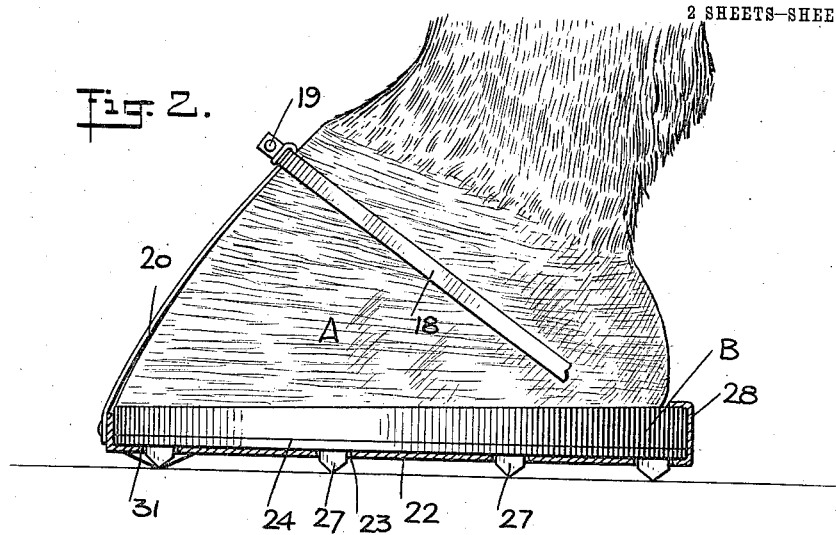
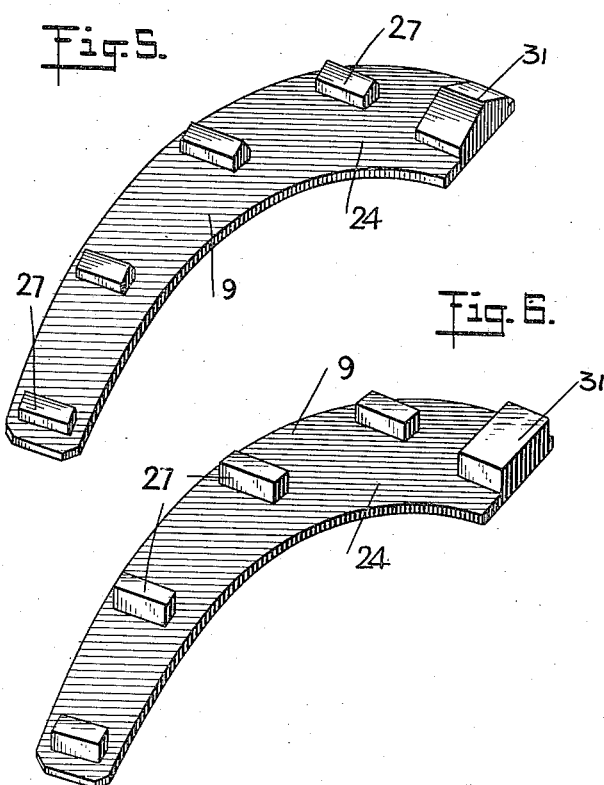
WITNESSES
INVENTOR
Charles Robert Cram
BY
ATTORNEYS

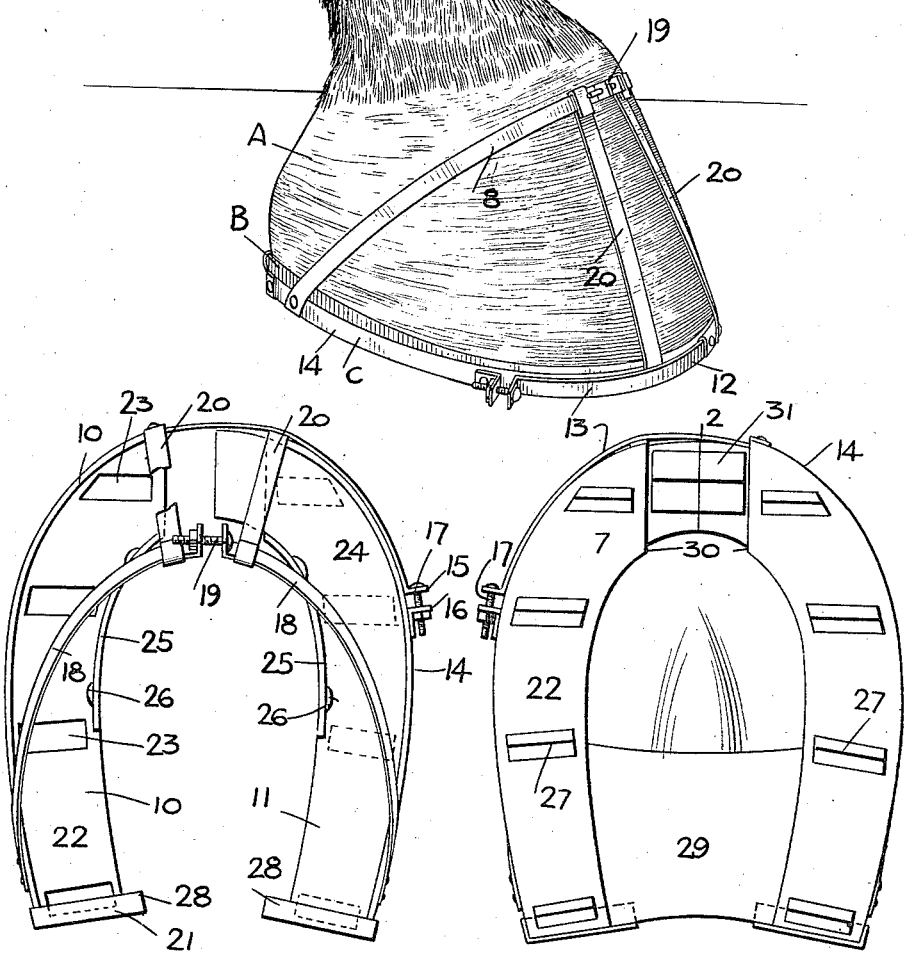

UNITED STATES PATENT OFFICE.

CHARLES ROBERT CRAM, OF NEW YORK, N. Y.

OVERSHOE FOR HORSES.

1,068,415.  Specification of Letters Patent.  Patented July 29, 1913.

Application filed September 28, 1912. Serial No. 722,884.

*To all whom it may concern:*

Be it known that I, CHARLES ROBERT CRAM, a citizen of the United States, and a resident of the city of New York, borough of Manhattan, in the county and State of New York, have invented a new and Improved Overshoe for Horses, of which the following is a full, clear, and exact description.

My invention relates to an overshoe for horses, and an object of my invention is to provide an overshoe, the tread portions of which may readily be replaced when worn or when a different character of tread is desired.

A further object of my invention is to provide an overshoe in which the hoof-supporting superstructure will contact with the hard front portion only of the hoof.

A still further object of my invention is to provide an overshoe, the several parts of which may readily be adjusted to fit different sized shoes.

I attain the above-outlined objects by constructing the overshoe in two parts, one of said parts comprising a two-part shell, the parts of said shell being adjustable relative to each other to fit different sized shoes, which shell includes the hoof-engaging portion, the bottom of said shell having apertures therein, through which apertures are adapted to project the calks forming part of a removable plate contained within the shell.

Reference is to be had to the accompanying drawings, forming a part of this specification, in which similar characters of reference indicate corresponding parts in all the figures, and in which—

Figure 1 is a perspective view of a horse's hoof showing a preferred embodiment of my invention thereon; Fig. 2 is a side elevation of the same with the shell shown in vertical section; Fig. 3 is a plan view of the overshoe; Fig. 4 is a view of the bottom of the overshoe; Fig. 5 is a perspective view of one of the removable plates showing the sharp-edge calks, and Fig. 6 is a similar view of a plate showing plate calks.

Described more in detail, I have shown a hoof A carrying an ordinary horse-shoe B, mounted upon which hoof and shoe is an overshoe C more particularly forming the subject-matter of my invention.

The overshoe comprises a permanent shell 7 including a superstructure 8 to fasten the same on the hoof and a calk or tread portion 9 removably positioned within said shell 7. The shell is preferably constructed of some light metal and comprises halves 10 and 11, which halves are adjustably fastened together at their crotch 12 by means of a band 13, having one end rigidly affixed to the front upstanding edge 14 of the half 10 and terminating in an outstanding bracket 15 in juxtaposition to the similarly shaped bracket 16 extending outwardly from the upstanding edge 14 of the half 11, which brackets 15 and 16 are adjusted relative to each other by a binding screw 17. By this construction, the halves 10 and 11 are brought together to conform in configuration to the plan of the regular shoe, and to fit any sized shoe within the limits of the overshoe.

Extending forwardly and upwardly from the rear of the edge 14 of each of the halves 10 and 11, is a hoof strap 18, which hoof straps extend toward each other and are fastened together in front of the hoof and at some material distance above the toe thereof, by means of a nut-and-bolt connection 19. By this connection, the hoof strap forming part of the superstructure is brought firmly into engagement with the front upper portion of the hoof. If desired, toe straps 20 may extend from the front of each of the halves 10 and 11 to engage the hoof straps 18 adjacent the connection 19, to maintain said hoof straps in position on the upper portion of the hoof.

Each half of the shell 7 terminates in a casing 21, forming a pocket to contain the projecting rear edge of the regular shoe. It will be noted that this shell engaging the rear of the regular shoe, will be held in position by the tension of the superstructure 8 engaging the front of the hoof. The bottom 22 of each of the halves 10 and 11 has a series of spaced apertures 23 extending therethrough, which apertures are preferably rectangular in plan and have their greatest length substantially parallel to a line tangent to the front of the hoof. Disposed between the bottom of the regular shoe B and the bottom 22 of each of the halves 10 and 11, is a flat removable plate 24 conforming substantially to one-half of the regular shoe, said plates being held in position against outward or lateral movement by the upstanding outer edges 14 and the upstanding inner edges 25, said edges forming an integral part of each of the halves 10 and 11. If desired, lugs 26 may extend inwardly from the upstanding edge portions 25 to engage recesses in the inner edge of the regular shoe. The plates 24 have projecting from one face thereof and preferably integral therewith, calks 27, which calks extend through the apertures 23 to form the gripping portion of the overshoe.

In ordinary dry weather use is preferably made of a plate having flat rectangular calks as shown in Fig. 6, but on wet slippery pavements, the sharp edge calks shown in Fig. 5 are substituted. It is to be understood that when these calks wear down, a new tread plate 24 may be substituted for the worn plate without the necessity of replacing the entire overshoe, as these plates may be readily and cheaply constructed and readily placed in the holding shell. If desired, the casings 21 may extend inwardly toward each other, as shown at 28, to form a holding means for a pad 29 sometimes used within the open end of the regular shoe.

As shown more particularly in Fig. 4, the bottom of the portion of the shell forming the crotch may be interrupted to form an open space 30, to permit the insertion of toe calks 31 carried by the crotch end of the plates 24.

Having thus described my invention, I claim as new and desire to secure by Letters Patent:

1. An overshoe for horses, comprising a shell consisting of two side-holding portions adjustably connected together at the crotch of the overshoe to fit different sized shoes, a hoof strap and a toe strap extending upwardly from each portion, means connecting the hoof straps across the front of the hoof, a plate disposed in each portion of the shell, and calks carried by each plate and projecting through the bottom of their respective portions to form tread members.

2. An overshoe for horses, comprising a shell consisting of two side-holding portions adjustably connected together at the crotch of the overshoe to fit different sized shoes, a hoof strap and a toe strap extending upwardly from each portion, means connecting the hoof straps across the front of the hoof, a plate disposed in each portion of the shell, calks carried by each plate and projecting through the bottom of their respective portions to form tread members, and lugs projecting from said shell adapted to engage recesses in the regular shoe.

3. In a horse overshoe, the combination of a shell, means connected to the shell for detachably securing the same to a hoof, tread means secured to the hoof by means of the shell, the heel portions of the shell being extended inwardly toward each other beyond the tread means, and a pad secured in place between the tread means aforesaid and said extended portions, substantially as set forth.

In testimony whereof I have signed my name to this specification in the presence of two subscribing witnesses.

CHARLES ROBERT CRAM.

Witnesses:
 FREDERICK C. BEACH,
 JOHN P. DAVIS.